United States Patent [19]

Bleicher et al.

[11] Patent Number: 4,732,217

[45] Date of Patent: Mar. 22, 1988

[54] HAMMER DRILL

[75] Inventors: Manfred Bleicher, Leinfelden-Echterdingen; Ulrich Bohne, Kohlberg; Karl Wanner, Leinfelden-Echterdingen, all of Fed. Rep. of Germany

[73] Assignee: Robert Bosch GmbH, Stuttgart, Fed. Rep. of Germany

[21] Appl. No.: 820,445

[22] Filed: Jan. 17, 1986

[30] Foreign Application Priority Data

Feb. 12, 1985 [DE] Fed. Rep. of Germany ....... 3504650

[51] Int. Cl.⁴ .............................................. B23B 45/16

[52] U.S. Cl. ..................................... 173/104; 173/109

[58] Field of Search ................. 173/104, 109, 48, 123, 173/116; 74/60

[56] References Cited

U.S. PATENT DOCUMENTS 4,433,596 2/1984 Scalzo ................................. 74/60 X
4,446,931 5/1984 Bleicher et al. ...................... 173/109
4,537,264 8/1985 Schmid et al. ....................... 173/109
4,612,999 9/1986 Bengler .............................. 173/109

*Primary Examiner*—E. R. Kazenske
*Assistant Examiner*—W. Fridie
*Attorney, Agent, or Firm*—Michael J. Striker

[57] ABSTRACT

A power driven hammer drill includes a percussive mechanism connectable to driving gears via a clutch. A pressure amplifying lever system is arranged between a movable part of the clutch and shiftable guiding means for a work tool to apply an amplified pressure on the clutch when the work tool is pressed against a workpiece.

10 Claims, 4 Drawing Figures

HAMMER DRILL

BACKGROUND OF THE INVENTION

The present invention relates to a hammer drill having means for guiding a work tool, a power driven percussive mechanism including an electric driving motor coupled via a gear train and a motion convertor to a reciprocating driven member, the driven member acting via an air cushion on an axially movable striking member whose energy is transferred to a work tool, a clutch arranged in the gear train and having a part adjustable into an operative position in response to a contact pressure of the work tool against a workpiece.

A hammer drill of this type is known from U.S. Pat. No. 4,280,359. In this known hammer drill the effectiveness of the releasable clutch between the electric motor and the driven member of the percussive mechanism is dependent on pressure applied by operator on the hammer drill. Apart from the difficult manipulation with the hammer drill, a reliable locking of the driven member of the striker depends on individual conditions inamuch as various operators of the drill cannot apply the same pressure on the latter.

SUMMARY OF THE INVENTION

It is therefore a general object of the present invention to avoid the disadvantages of prior art hammer drills of this kind.

In particular, it is an object of the present invention to provide such an improved hammer drill in which the requisite force applied by operator during hammer drilling is extremely small whereby the actual locking force acting on the clutch is greater than that resulting in operation of conventional hammer drills under application of the same pressing force.

In keeping with these objects and others which will become apparent hereafter, one feature of the invention resides in the provision of a mechanism for transferring axial movement of the work tool to a movable part of the clutch to adjust the clutch into an operative condition in response to a contact pressure of the work tool against a workpiece, and means cooperating with the transferring means to amplify the effect of the contact pressure on the movable clutch part.

In the preferred embodiment of this invention, the transferring means and amplifying means are designed as a lever system where at least one member acts against the movable clutch part with an amplified force. In this manner the improved hammer drill is simple in structure and requires a small number of additional parts fitting in a minute installation space.

According to the design of the movement transmitting and amplifying member, this invention is applicable in connection both with a percussive mechanism whose drive includes a driving shaft extending parallel to the direction of percussions and also in connection with a mechanism whose driving shaft forms an angle to the axis of percussions.

In a particularly advantageous embodiment of this invention at least one movement transmitting member is designed such that the amplified effect of a pressure applied against the work tool on the moving parts of the clutch does not exceed a predetermined level after which the pressure against a workpiece is ineffective. In this manner it is made possible to obtain an optimum coupling which after a certain limit is independent from the applied pressure on the tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
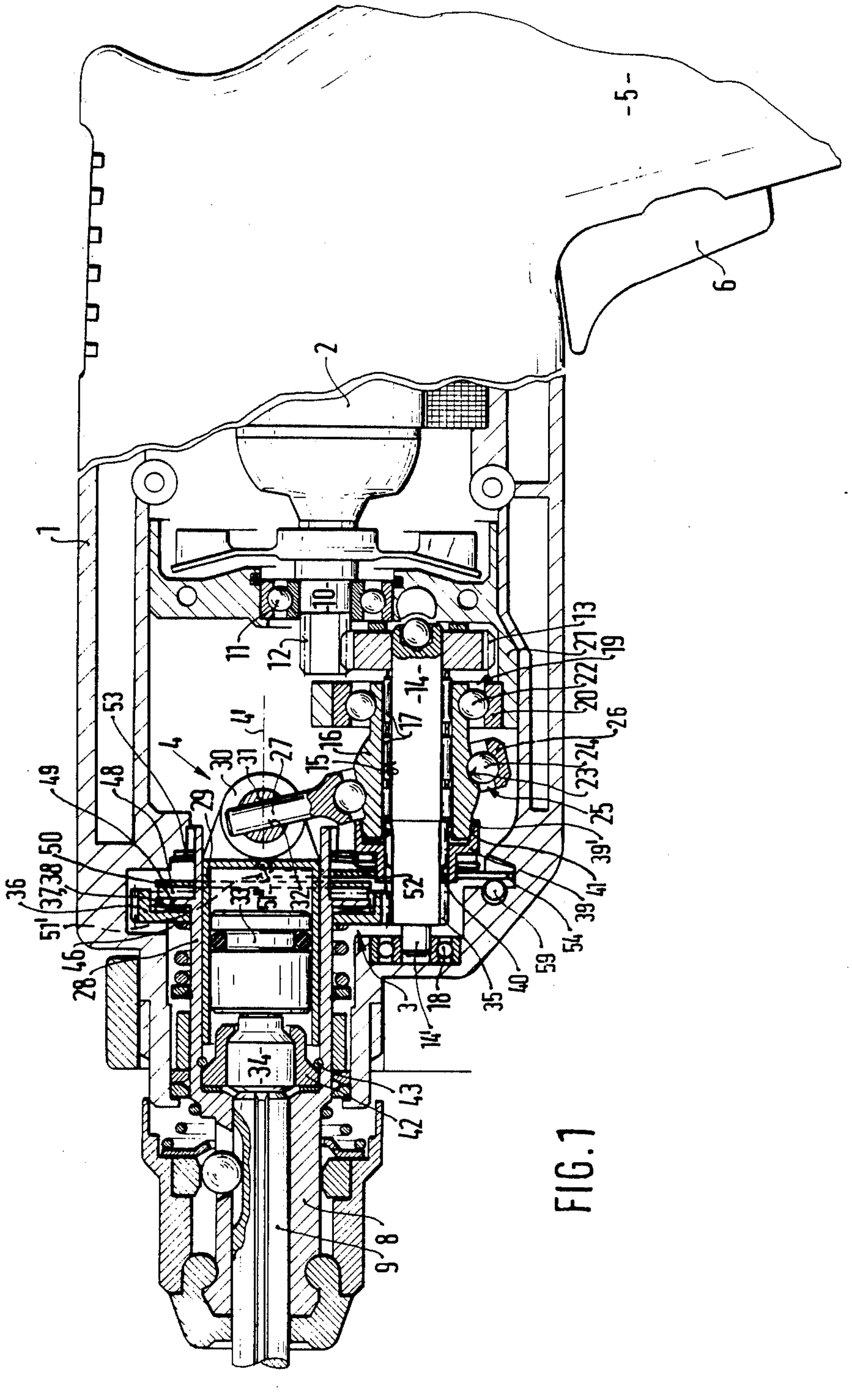
FIG. 1 is a side view, partly in section, of a hammer drill of this invention.
Figure 2:
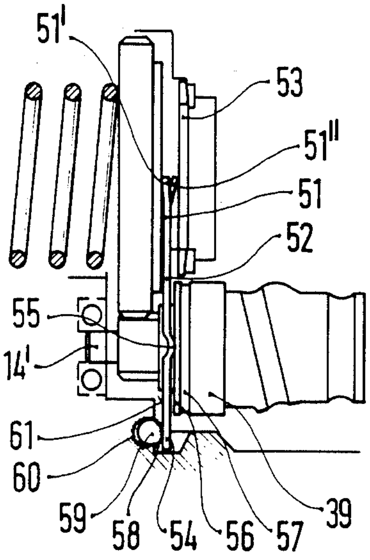
FIG. 2 is a side view of a clutch force amplifying mechanism in the hammer drill of FIG. 1.

The embodiment of the hammer drill illustrated in FIGS. 1 and 2 includes a housing 1 enclosing an electric motor 2, a gear train 3 and a percussive mechanism 4. Striking axis 4' of the percussive mechanism extends parallel to the axis of rotation of the electric motor 2. The rear end of housing 1 is formed with a hand grip 5 in which a power switch controlled by a pushbutton 6 is installed by means of which the electric motor 2 is set in operation. A nonillustrated bottom end of the hand grip 5 is provided with an elastic funnel for holding a power supply cable. The front end of the housing remote from the hand grip 5 is provided with a work tool holder 8 which serves for receiving and guiding a work tool, in this case a drill 9.

The electric motor 9 has a driving shaft 10 which at both ends thereof is supported for rotation in ball bearings attached to the housing 1. The end part of shaft 10 supported in ball bearing 11 is provided with a pinion 12 meshing a gear 13 pressed on an end of an intermediate shaft 14. The intermediate shaft 14 passes through a center bore 15 of a drum 16. The drum 16 is rotatably supported on needle bearings 17 arranged in the space between the shaft 14 and the inner wall of the bore 15. The end of shaft 14 remote from the electric motor 2 is supported for rotation in ball bearing 18 secured to the housing.

The end part of drum 16 remote from the ball bearing 18 is provided with a ball bearing track forming an inner race of ball bearing 19 whose outer race is fixed to housing part 21. In addition, an intermediate part of drum 16 is provided with a bearing track 23 whose center axis is inclined relative to the axis of the intermediate shaft 14. The bearing track 23 forms an inner race for guiding balls 24 of a ball bearing 25. The outer race 26 of the ball bearing 25 thus acts as a wobble disc. A radially directed finger 27 is integral with the outer race 26 and serves for driving the percussive mechanism 4.

The percussive mechanism 4 is arranged within a guiding tube 28 which in this embodiment forms an integral part of a tool holder 8. The guiding tube 28 is rotatably supported within the housing 1. A driving member in the form of a piston 29 is slidably guided in a tight contact with the inner wall of the guiding tube 28. The end 30 of piston 29 remote from the tool holder 28 has a fork-like configuration and supports a rotary bolt 31 between its prongs. The bolt 31 is provided with a transverse bore 32 engaging with a play the wobbling finger 27 so that the latter is free to move in axial direction of the bore 32. In the hollow piston 29 a striking body 33 is slidably guided to act via an anvil 34 of the rear end of a work tool 9 inserted into the tool holder 8.

The end part of the intermediate shaft 14 remote from the ball bearing 19 is formed with a pinion 35 meshing into a gear 36 which is slidably supported for rotation on the jacket of the guiding tube 28. The gear 36 is biased by a pressure spring 46 against a flange 50 on the guiding tube 28. The opposite end faces of the gear 36 and of the flange 50 are provided with projections 37 and 38 cooperating with each other and with the biasing spring 46 to serve as an overload serrated coupling. A cup-shaped sleeve 39 is inserted on the toothed end portion of the intermediate shaft 14 and has inner teeth which are in mesh with the pinion teeth of the shaft, and is shiftable in axial direction on the latter. The edge part 39' of the cup-shaped sleeve 39 has a conically sloping inner wall cooperating with a correspondingly shaped end portion 41 of the drum 16. In this manner, the sleeve 39 together with the outer conical part 41 form a conical coupling by means of which the drum 16 is connectable for joint rotation with the intermediate shaft 14. The engagement of the coupling parts 39 and 41 occurs by the action of guiding tube 28 which on pressing the drill 9 against a workpiece is shifted rearward relative to the housing part 1.

When the drill 9 abuts against a workpiece and the operator pushes the housing toward the workpiece, the rear end of the drill 9 presses against the anvil 34 which is enclosed with a minute axial play in a casing 42. The casing is secured to the inner wall of the guiding tube 28 by a clip ring 43. Consequently, the pressure exerted by the drill 9 on the anvil 34 is transmitted via the casing 42 and the clip ring 43 onto the guiding tube 28 and causes an axial shift of the latter and of the tool holder 8 relative to the housing 1. Due to the axial shift, the flange 50 on the guiding pipe 28 presses via an axial bearing 48 and a disc 49 against a fork-like end 51 of a two-arm lever 52 embracing the rear end of the guiding tube 28. The fork-like end 51 of the lever 52 is provided with lugs 51' and 51" directed respectively against the disc 49 and against a plate spring 53. The other end 54 of the lever 52 has also a fork-like configuration and embraces the end of the intermediate shaft 14 that supports the conical sleeve 39 forming the movable part of the clutch 39, 41. At the level of the center axis of the intermediate shaft 14, as seen in FIG. 2, the bifurcated end part 54 of the lever 52 is provided with projections 55 slidably engaging via a disc 56 and an axial bearing 57, the end face of the coupling sleeve 39. The bifurcated end 54 of the lever 52 is seated in a recess 58 in the inner wall of housing 1. In the proximity of the recess 58 an eccentric pin 59 is supported for rotation about it center axis whereby its eccentric part projects into the recess 58. As indicated in FIG. 2, the bearing parts of the eccentric pin are provided with knurl-like serrations 60 engaging the bearing walls in housing 1 to prevent unintended rotation of the pin. The eccentric pin serves for adjusting the lever 52 as it will be explained below.

In the embodiment of FIGS. 1 and 2, the lever 52 is loosely inserted in housing 1 in such a manner that its lower fork-like end 54 enters the housing recess 58 and is supported therein. The projections 55 on the prongs of the bifurcated lever end 54 contact the disc 56 on the end face of the clutch sleeve 39. The lowermost end part of the opposite surface 61 of the bifurcated end 54 engages the eccentric pin 59.

If by pressing work tool 9 inserted in the hammer drill against a workpiece the guiding tube 28 and hence the axial bearing 48 and the disc 49 are shifted rearward relatively to the housing 1, the end face of disc 49 presses against the lug 51' at the upper bifurcated end 51 of the lever 52. Since the lower bifurcated end 54 due to its engagement with the eccentric pin 59 cannot deflect, the bifurcated upper end 59 is tilted in the direction of the conical coupling 39, 41. In doing so, the projections 55 pass against the end face of the disc 56 which via the axial bearing 57 displaces the coupling sleeve 39 into engagement with the outer conical surface 41 of the drum 16 and the coupling connects the intermediate shaft 14 with the drum 16. The lever 52 is made of a sufficiently flexible material so that in the event that operator increases pressure on the hammer drill and the guiding tube 28 is further shifted rearwardly relative to the housing 1, the upper arm of the lever 52 is resiliently deflected and effective force acting on the coupling parts 39 and 41 does not exceed a predetermined value. The plate spring 53 counteracting the lug 51" has its resilient force dimensioned such as to permit the above described rearward deflection of the upper bifurcated part 51 of the lever. The plate spring 53 serves for returning the lever 52 into a position in which the coupling 39, 41 is disconnected even in the case when upon relieving the pressure on the hammer drill and upon turning the hammer drill with the inserted work tool upward, the own weight of the work tool is counteracted by the plate spring. Consequently, a no-load operation of the hammer drill which might be caused by engaging the coupling 39, 41 by the own weight of the work tool, is effectively prevented.

The projections 55 of the lever 52 act as a fulcrum of the two-arm lever 52 whereby the force transmitted from the guiding tube 28 to the clutch sleeve 39 is amplified by a factor depending on the ratio of distances between the projections 55 and the point of contact of the lug 51' with the disc 49 and between the projections 55 and the point of contact of the lower end 54 with the eccentric pin 59.

By adjusting the angular position of the eccentric pin 59 it is made possible to compensate in a simple manner manufacturing tolerances. Of course, if desired, this adjustment possibility can be dispensed with and the lower end of lever 52 can be secured to a pivot axle mounted in the housing 1.

Figure 3:
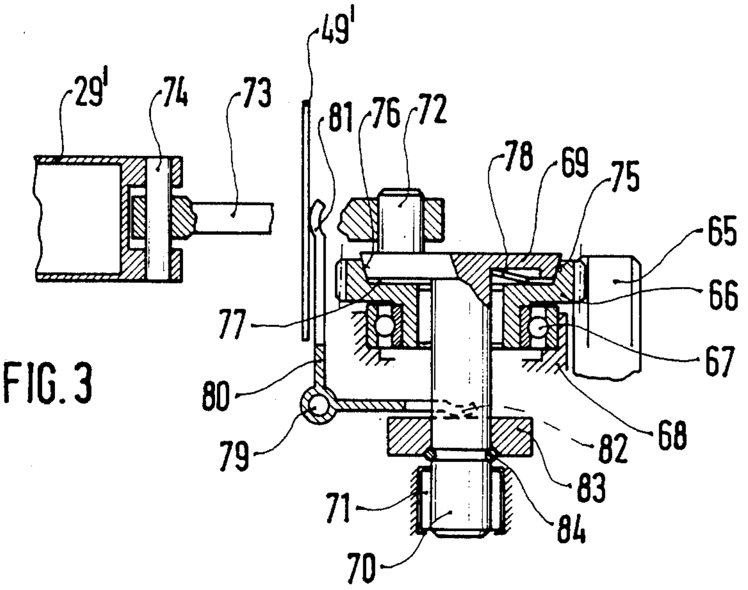
FIGS. 3 and 4 show, in sectional side views, modifications of the mechanism of FIG. 2.

FIG. 3 illustrates schematically an embodiment of this invention in which the drive of the percussive mechanism is effected by means of a crank type drive. Reference numeral 65 indicates a driving pinion fixed on a shaft of a nonillustrated driving motor or coupled to the latter by gears. The pinion 65 is in mesh with a gear 66 supported for rotation in housing part 68 by means of a ball bearing 67. A crank disc 69 is provided with a central pin 70 which is integrally connected therewith and supported for rotation and for an axial displacement in a needle bearing 71 in the housing 68. The crank disc 69 carries an eccentrically arranged crank pin 72 projecting into a bore formed at one end of a connecting rod 73. The other end of the rod 73 is linked to a piston pin 74 supported in a fork-like end of a piston 29'. The piston 29' corresponds in function to the piston 29 in the embodiment of FIG. 1 to drive via an air cushion and a striker body an anvil of the work tool.

The crank disc 69 has on its circumference a beveled part 75 which cooperates with a correspondingly coneshaped inner wall 76 in a recess 77 of the gear 66 to form therewith a clutch. A plate spring 78 arranged in the recess 77 biases the crank disc 69 away from the conical inner wall 76 in order to keep the clutch or coupling 75, 76 in open position. A two-arm elbow lever 80 is pivotably supported on a pin 79 fixed to the housing 68. Similarly as in the preceding example, both arms 81, 82 of the lever have a fork-like configuration. The lever arm 81 cooperates with a disc 49' corresponding in operation to the disc 49 in the example of FIG. 1. The other arm 82 of the lever slidably engages a disc 83 mounted on the stem 70 of the crank disc. The disc 49' cooperates with similar parts as in the preceding example and consequently for the sake of simplicity these parts have been omitted in FIG. 3. Also in this embodiment the disc 49' is shifted opposite the feeding direction of the work tool when the latter is pressed against a workpiece. The displacement of the disc 49' causes the rotation of the two-arm lever 80 about its pivot pin 79 whereby the arm 82 presses against the disc 83. Since the latter disc is secured to the axle 17 by a clip ring 84, the crank disc 69 is moved against the force of plate spring 78 and the clutch 75, 76 is connected and consequently the crank disc 69 starts rotating together with the driving gear 66. The rotary movement is transferred in known manner via the crank pin 72, the connecting rod 73 to the piston pin 74 where it is transformed in a reciprocating movement of the piston 29'.

Also in this embodiment the force applied by an operator on the work tool and transmitted to the movable coupling part 69 is amplified by the two-arm lever 80 constituting the power transmitting member. The amplification factor is directly proportional to the ratio of the length of lever arm 81 to the length of the lever arm 82. Also in this example at least one of the lever arms 81, 82 is made of a resilient material dimensioned such that upon reaching a preset pressure force against the coupling clutch, a further increase of pressing force applied on the work tool has no or insignificant effect in the range of the coupling.

Figure 4:
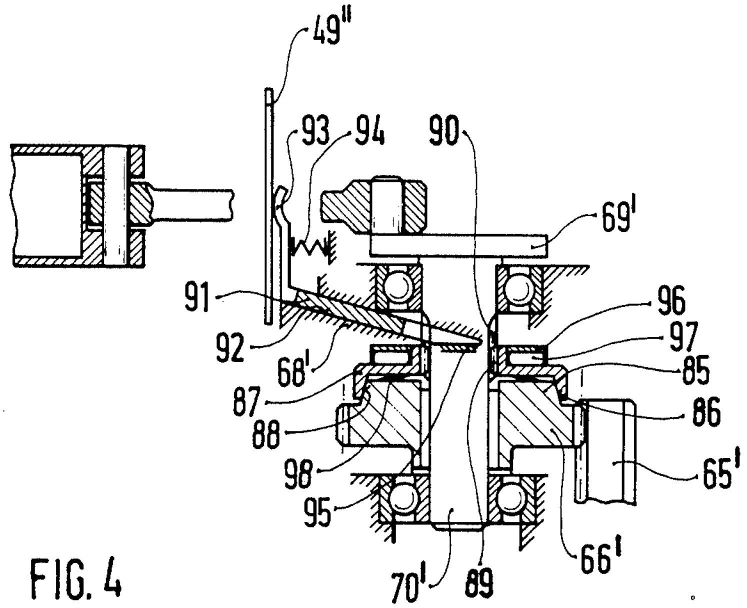

In the embodiment according to FIG. 4, the pivotably supported two-arm lever is replaced by a wedge-type drive. The crank drive for the percussive mechanism corresponds substantially to that illustrated in FIG. 3. A driving pinion 65' meshes with a gear 66' which freely rotates about a central shaft 70' of a crank disc 69'. The gear 66' is provided on its upper end with a projection 85 having a conical jacket 86. A sleeve 87 formed with a matching conical inner wall 88 is shiftably mounted on the stem 70' opposite the projection 85. The conical sleeve 87 is provided with splines 89 engaging corresponding splines 90 on the stem 70' so that the two parts are permanently connected for rotation but are shiftable in axial direction relative to each other.

A slider 91 is arranged for a sliding movement in a guiding groove 92 formed in the housing 68'. The guiding groove extends obliquely to the center axis of the stem 70'. The slider 91 is connected at one end thereof with an angular fork-shaped arm 93 which is biased by a spring 94 against a plate 49'' whose function is similar to plates 49 and 49' in the preceding examples. The other end of slider 91 has also a fork-shaped configuration and embraces the stem 70'. Wedge-shaped edges of the other end of slider 91 slidably engage a disc 96 which by means of rollers 97 is supported for rotation on the upper surface of the cup-shaped sleeve 87.

Also in this embodiment the pressing of the tool against a workpiece causes the relative displacement of the disc 49'' to the right and presses the fork-shaped arm 93 against the biasing force 94. Due to the inclined position of the guiding groove 92, the movement imparted to the slider 91 by the arm 93 is amplified by the wedging action of the inclined edge of the slider against the disc 96 of the coupling 87. The coupling sleeve 87 is pressed against the conical surface on the driving gear 66', the conical surfaces 86 and 88 engage each other and the driving connection between the crank disc 69 and the driving pinion 65' is established. As soon as operator relieves pressure against the work tool, the disc 49'' disengages the lever arm 93 and the latter is returned by spring 94 together with the slider 91 in their rest positions. A plate spring 98 arranged between the gear 66' and the coupling sleeve 87 disengages the coupling sleeve 87 from the conical surface 88 and the drive for the percussion mechanism is again inactivated. The arm 93 can be designed such that upon reaching a present pressure in the range of the coupling connection 86, 88 it bends resiliently when pressure applied on the work tool is increased.

While the invention has been illustrated and described as embodied in a specific example of the improved hammer drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A hammer drill having a housing and within the housing means for guiding a work tool, a percussive mechanism including an electric motor coupled via a gear train and a rotary motion convertor to a reciprocating driving member, the driving member acting via an air cushion on an axially movable striking member whose energy is transferred to a work tool inserted in said guiding means, a clutch having an axially movable part in mesh with said gear train and an axially fixed part provided on said motion convertor, comprising means for transferring relative axial movement between the work tool and the housing to said movable clutch part to control the connection between said gear train and said motion converter in response to a contact pressure of the work tool against a workpiece, said transferring means including power transforming means for amplifying the effects of said contact pressure on said clutch, said guiding means being displaceable relative to said housing in response to a control pressure of the work tool against a workpiece, and said power transforming means including a lever system arranged between said housing, said guiding means and said movable clutch part so as to amplify pressure transmission from said guiding means against said clutch part.

2. A hammer drill having a housing and within the housing means for guiding a work tool, a percussive mechanism including an electric motor coupled via a gear train and a rotary motion convertor to a reciprocating driving member, the driving member acting via an air cushion on an axially movable striking member whose energy is transferred to a work tool inserted in said guiding means, a clutch having an axially movable part in mesh with said gear train and an axially fixed part provided on said motion convertor, comprising means for transferring relative axial movement between the work tool and the housing to said movable clutch part to control the connection between said gear train and said motion converter in response to a contact pressure of the work tool against a workpiece, said transferring means including power transforming means for amplifying the effects of said contact pressure on said clutch, said guiding means being displaceable relative to said housing in response to a control pressure of the work tool against a workpiece, said power transforming means including a one-arm lever system arranged between said guiding means and said movable clutch part, one end of said one-arm lever being tiltably supported in said housing, and the other end of said lever engaging said guiding means and an intermediate part of said lever engaging said movable clutch part.

3. A hammer drill as defined in claim 2 comprising a recess in said housing, an eccentric pin mounted for rotation about its center axis in said recess, and said one end of the one arm lever being inserted in said recess in contact with said eccentric pin.

4. A hammer drill as defined in claim 3, wherein said eccentric pin is provided with knurled bearings to prevent unintentional rotation.

5. A hammer drill as defined in claim 2, wherein said one-arm lever system includes means which limit a transferred pressure on said movable clutch part to a predetermined value.

6. A hammer drill as defined in claim 5, wherein a part of said one-arm lever system which engages said guiding means is of a resilient material having a predetermined stiffness to yield after a predetermined pressure value.

7. A hammer drill as defined in claim 6 further comprising spring means cooperating with said one-arm lever system to adjust said movable clutch part in a disengaged position when no pressure is applied against said work tool, the stiffness of said spring means being dimensioned as to counteract own weight of said work tool in order to prevent no load activation of said hammer drill.

8. A hammer drill as defined in claim 2, wherein said one-arm lever includes at least one fork-shaped lever embracing said guiding means.

9. A hammer drill having a housing and within the housing means for guiding a work tool, a percussive mechanism including an electric motor coupled via a gear train and a rotary motion convertor to a reciprocating driving member, the driving member acting via an air cushion on an axially movable striking member whose energy is transferred to a work tool inserted in said guiding means, a clutch having an axially movable part in mesh with said gear train and an axially fixed part provided on said motion convertor, comprising means for transferring relative axial movment between the work tool and the housing to said movable clutch part to control the connection between said gear train and said motion converter in response to a contact pressure of the work tool against a workpiece, said transferring means including power transforming means for amplifying the effects of said contact pressure on said clutch, said guiding means being displaceable relative to said housing in response to a control pressure of the work tool against a workpiece, and said power transforming means including an angle lever having its fulcrum pivotably supported on said housing, one arm of said angle lever engaging said guiding means and the other arm engaging said movable clutch part.

10. A hammer drill as defined in claim 9, wherein said angle lever includes a wedge-type drive slidably supported in said housing and coupled between said guiding means and said movable clutch part.

* * * * *